United States Patent [19]

Hanotier

[11] 3,852,342

[45] Dec. 3, 1974

[54] PROCESS FOR THE LIQUID PHASE OXIDATION OF METHYLAROMATIC COMPOUNDS INTO POLYCARBOXYLIC ACIDS

[75] Inventor: Jacques D. V. Hanotier, Brussels, Belgium

[73] Assignee: Labofina S.A., Brussels, Belgium

[22] Filed: Sept. 1, 1972

[21] Appl. No.: 285,733

[52] U.S. Cl. .................. 260/524 R, 260/523 A
[51] Int. Cl. ............................. C07c 63/02
[58] Field of Search ........................ 260/524 R

[56] References Cited
UNITED STATES PATENTS

| | | |
|---|---|---|
| 3,361,803 | 1/1968 | Augustynowicz .................. 260/524 |
| 3,519,684 | 7/1970 | Witt et al. ........................ 260/524 |
| 3,819,695 | 6/1974 | Yamashita et al. ............. 260/524 R |

Primary Examiner—Lorraine A. Weinberger
Assistant Examiner—Richard D. Kelly

[57] ABSTRACT

Methylaromatic compounds having at least two substituents on vicinal nuclear carbon atoms and the oxidation intermediates thereof wherein at least one methyl substituent is vicinal to a methyl or hydroxymethyl, formyl or carboxyl group, are oxidized at low temperature into polycarboxylic acids having carboxyl groups on vicinal nuclear carbon atoms by reaction in acetic acid and in the presence of molecular oxygen with an active cobaltic salt in high concentration.

6 Claims, No Drawings

PROCESS FOR THE LIQUID PHASE OXIDATION OF METHYLAROMATIC COMPOUNDS INTO POLYCARBOXYLIC ACIDS

BACKGROUND OF THE INVENTION

The present invention relates to a new and improved process for producing polycarboxylic acids having at least two carboxyl groups on vicinal nuclear carbon atoms. More particularly, this invention relates to an improved method for producing such polycarboxylic acids by oxidizing methylaromatic compounds having at least one methyl substituent on a nuclear carbon atom vicinal to another nuclear carbon atom substituted by a radical selected from the group consisting of methyl, hydroxymethyl, formyl and carboxyl.

It is a well known fact that the processes used commercially for producing terephthalic and isophthalic acids from the corresponding xylenes are carried out in the liquid phase while phthalic acid is still produced, as its anhydride, by vapor phase oxidation. This situation can be ascribed to the fact that the catalytic liquid phase method, whose superiority over other techniques is well established for the oxidation of p- and m-xylenes has in the past resulted in low yields in dicarboxylic acid when applied to the oxidation of o-xylene.

Among the most effective liquid phase processes heretofore proposed for the oxidation of alkylaromatics by molecular oxygen are those using as catalyst a cobalt salt activated by different agents, e.g., ozone, methylethylketone, acetaldehyde, or peracetic acid, etc... It is generally accepted that the effect of such agents is to bring cobaltous ions to the cobaltic state thereby promoting initiation of free radical chains by the following reaction:

$$Co(III) + ROOH \rightarrow Co(II) + ROO\cdot + H^+ \quad (1)$$

wherein R is an alkyl aromatic acid.

These known processes have proven to be useful for the oxidation of aromatic hydrocarbons such as p- or m-xylenes into the corresponding dicarboxylic acids and some of them have indeed found commercial application. However, when such processes are applied to the oxidation of o-xylene, the main product is o-toluic acid and the yield in phthalic acid is generally negligible. Similarly, when the same processes are applied to other aromatic compounds having methyl groups on vicinal nuclear carbon atoms, e.g., pseudocumene or durene, the reaction is generally limited to the oxidation of one or two non-adjacent methyl groups. For instance, when pseudocumene is oxidized in acetic acid with cobalt salt as catalyst and methylethylketone as initiator, there is obtained a mixture of 2-methylterephthalic and 4-methylisophthalic acids. When the same method is applied to durene, there is obtained a mixture of 2,5 dimethylterephthalic and 4,6-dimethylisophthalic acids. Thus, in the liquid phase oxidation of such hydrocarbons having methyl substituents on vicinal nuclear carbon atoms, there is apparently some auto-inhibition phenomenon which precludes complete conversion of all methyl substituents into carboxyl groups.

To overcome the above disadvantages, some modifications of known methods have been devised. Such modifications include staged introduction of different metal catalysts and/or staged heating, particularly in the presence of a bromine-containing promotor, at high temperature and pressure. However, these modifications often present practical problems for commercial application such as difficulties in operating control and to the use of a highly corrosive medium. In addition, such modifications do not always provide the desired yields of the desired polycarboxylic acids, especially from aromatic feeds containing aromatics having more than one pair of methyl substituents on vicinal nuclear carbon atoms.

It has now been discovered that methylaromatic compounds having at least two methyl substituents on vicinal nuclear carbon atoms as well as the oxidation intermediates thereof, can be oxidized in good yield into polycarboxylic acids having at least two carboxyl groups similarly situated, under particularly mild conditions with respect to temperature, pressure and corrosion, by using as the oxidizing catalyst an active cobaltic salt in high concentration.

According to the present invention, there is provided a process for the liquid phase oxidation of methylaromatic compounds having at least one methyl substituent on a nuclear carbon atom vicinal to another nuclear carbon atom substituted by a radical selected from the group consisting of methyl, hydroxymethyl, formyl and carboxyl radicals, into polycarboxylic acids having at least two carboxyl groups on vicinal nuclear carbon atoms, said process comprising reacting in acetic acid said methylaromatic compounds with a cobalt salt while maintaining such a concentration of cobaltic ions that $2x-A$ is at least $0\text{-}2,x$ and $A$ being the molarity of said cobaltic ions and said cobalt salt, respectively, in the reaction mixture, at a temperature between 20° and 100°C and in the presence of molecular oxygen at a partial pressure of from 0.2 to 20 atmospheres.

The cobalt salt used in the process of the present invention may be any cobalt salt sufficiently soluble in the reaction mixture to reach the desired concentration. The cobalt salts of aliphatic carboxylic acids generally fulfill this condition and, as acetic acid is used as solvent in the present process, cobalt acetate is particularly suitable.

It has been discovered, and this discovery forms in part the basis of the present invention, that when a methylaromatic compound is contacted with a cobalt salt in acetic acid at a temperature in the range specified hereinabove, efficient oxidation takes place only when the concentration of ions of the cobalt salt and of the cobaltic portion thereof, respectively referred to as $A$ and $x$, are such that $2x-A$ amounts at least to 0.2 and preferably to at least 0.4. This indicates not only that the cobalt salt must be at a concentration of at least 0.2, preferably at least 0.4, when it is fully cobaltic, i.e., when $x = A$, but also that a high concentration of cobaltic ions is not sufficient by itself for ensuring active oxidation if the total concentration of cobalt is too high for the above condition to be satisfied. The activity of cobaltic ions is drastically reduced when $2x-A$ becomes lower than 0.2, even for high values of $A$, so as to be practically negligible when $2x-A = 0$. Accordingly, $2x-A$ may be considered and will be referred to hereinafter as the concentration of active cobaltic species or active cobalt (III).

Another unexpected feature of the present invention is the fact that in the presence of active cobalt (III) in high concentration as specified hereinabove, methylaromatic compounds are oxidized rapidly at temperatures lower than 100°C, i.e. between 20° and 100°C and preferably between 40° and 80°C, whereas temperatures higher than 100°C and even higher than 200°C generally are required in the processes of the prior art. This difference may be ascribed to the fact that at such high concentrations of active cobalt (III), the reaction no longer proceeds through a radical chain process but rather through a mechanism involving direct electron abstraction from the substrate by the active cobaltic species and simultaneous reduction of the latter into their cobaltous form as shown in the following equation:

$$RH + Co(III) \rightarrow R \cdot + H^+ + Co(II) \qquad (2).$$

wherein R is an aromatic nucleus.

In this case, the cobalt salt does not work as a catalyst to promote initiation as illustrated by equation (1) but actually as a reactant. This mechanism is supported in that effective reduction of cobalt (III) may be observed even in the absence of any oxygen, with formation of different oxidation products such as esters.

For oxidizing methylaromatic compounds into carboxylic acids as required for most practical applications, molecular oxygen must be supplied to the reaction zone. Pure oxygen or any oxygen-containing gas such as air may be used for this purpose. In most cases, partial pressure of oxygen of from 0.2 to 20 atmospheres or more will ensure the methyl substituent to be transformed into carboxyl groups with negligible production of compounds having other oxygenated substituents such as formyl or hydroxymethyl groups.

Since cobalt (III) works in the present process as a reactant and not as a catalyst, it is reduced as the reaction proceeds into its lower valency state so that, even when starting with a high concentration of active cobalt (III), this concentration would rapidly fall below the limit required for active oxidation. To achieve high yields in the desired polycarboxylic acids it is therefore necessary to maintain a high concentration of active cobalt (III) throughout the reaction by reoxidizing the cobaltous species produced as a result of the reaction. This can be made continuously or intermittently, in the reaction vessel or separately, by known means, e.g., by anodic oxidation or by chemical agents, such as ozone or peroxide compounds or still by cooxidation with an aldehyde. A particularly convenient method is to continuously supply acetaldehyde into the reaction zone at a controlled rate such as to maintain the desired level in active cobaltic species.

In accordance with the invention, if the concentration of active cobalt (III) is maintained higher than 0.4 atom-gram per liter, the oxidation of methylaromatic compounds proceeds so efficiently that the autoinhibition phenomenon which in the prior art methods is responsible for the limited conversions of those compounds having adjacent methyl groups, is no longer observed even at low temperatures and pressures. Accordingly, although the process of the present invention may be applied successfully to the oxidation of methylaromatics such as toluene, p- and m-xylene, mesitylene and the oxidation intermediates thereof, it is especially useful for the oxidation of methylaromatic compounds having at least one methyl substituent on a nuclear carbon atom vicinal to another nuclear carbon atom substituted by a radical selected from the group consisting of methyl, hydroxymethyl, formyl and carboxyl. Specific examples of such compounds are o-xylene, pseudocumene, hemimellitene, durene, prehnitene, isodurene, pentamethylbenzene, hexamethylbenzene and oxidation intermediates thereof such as o-methylhyroxymethylbenzene, o-tolualdehyde, o-toluic acid, 2-methylterephthalic acid, 4,6-dimethylisophthalic acid and the like, further substituted or not by alkyl groups other than methyl or still by non-oxidizable radicals such as nitro, chloro or bromo. By selecting the proper conditions, e.g., reaction time and temperature, such compounds can be oxidized by the process of the present invention to afford good yields in polycarboxylic acids having at least two carboxyl groups on vicinal nuclear carbon atoms. For instance, o-xylene can be oxidized quantitatively into phthalic acid, pseudocumene can be oxidized in high yield into trimellitic acid and durene yields mainly pyromellitic acid together with some methyltrimellitic acid. Such polycarboxylic acids are known to be of particular value as intermediates for the manufacture of high-performance plasticizers, coatings, films and fibres.

The invention will now be further described by the following examples which are given only for purposes of illustration and are not intended to limit the scope of the invention.

EXAMPLE 1

Into a stainless steel autoclave equipped with a mechanical agitating device, a heating jacket, a cooling coil, a gas inlet tube and a vent, there were charged 0.08 mole of pseudocumene and 210 ml of a solution containing 0.21 mole of cobalt acetate in acetic acid. The ratio of cobaltic to total cobalt ions in this solution was 0.95 so that the concentration of active cobalt (III) as defined hereinbefore was initially of about 0.90 atom-gram per liter.

Air was introduced into the resulting solution at a rate of 100 liters per hour while stirring and maintaining the pressure at 10 Kg per cm². In order to ensure that the concentration of active cobalt (III) was above 0.2 atom-gram per liter throughout the reaction, acetaldehyde was fed into the reaction mixture at a rate of 5 g per hour as a 35 wt percent solution in acetic acid. The mixture was heated progressively for about one hour up to a temperature of 60°C and then was maintained at this temperature for an additional 4 hours.

At the end of the run, the reaction mixture was cooled and withdrawn after depressurization of the autoclave. Active cobalt (III) determined on an aliquot was still at a concentration of 0.73 atom-gram per liter in spite of the fact that the initial solution had been diluted with the acetaldehyde solution.

To determine the aromatic acids produced from pseudocumene, another aliquot part of the reaction mixture was first treated with an aqueous solution of a ferrous salt to reduce the cobaltic ions. The resulting mixture was then evaporated to dryness and the residue treated with aqueous alkali. Precipitated metals were removed by centrifuging and the clear alkaline solution analyzed for aromatic acids by a method combining paper chromatography and UV spectrophotometry. It was found that 70 percent of the starting pseudocumene had been transformed into trimellitic acid and 28 percent into methylphthalic acid.

EXAMPLE 2

The procedure of Example 1 was repeated except that heating at 60°C was continued for an additional 2 hours. Only trimellitic acid was detected in the final reaction mixture, corresponding to a molar yield of 84 percent based on the pseudocumene feed.

EXAMPLE 3

The procedure of Example 1 was repeated except that o-xylene was substituted for pseudocumene. Only phthalic acid was detected in the final reaction mixture, corresponding to a molar yield of 95 percent based on the o-xylene feed.

EXAMPLE 4

The procedure of Example 1 was repeated except that 0.06 mole of durene was substituted for pseudocumene and the heating at 60°C was continued for five instead of four hours. At the end of the run, the concentration of active cobalt (III) was still 0.65 atom-gram per liter.

The reaction mixture was treated and analyzed by the same method as described in Example 1. It was determined that polycarboxylic acid had been formed in the following yield based on the durene feed:

| | | |
|---|---|---|
| Pyromellitic acid | : | 57% |
| Methytrimellitic acid | : | 21% |
| Dimethylphthalic acids | : | 14% |

The total yield in polycarboxylic acids therefore was 92 percent, i.e., overoxidation amounted to only 8 percent of the durene feed.

The same procedure was again repeated except that 0.03 mole of cobalt acetate was used instead of 0.21 mole. The concentration of active cobalt (III) in the final reaction mixture was only 0.10 atom-gram per liter. The molar yields in polycarboxylic acids based on the durene feed were as follows:

| | | |
|---|---|---|
| Pyromellitic acid | : | 16% |
| Methyltrimellitic acid | : | 40% |
| Dimethylphthalic acids | : | 19% |

By comparing these last results with the former ones, it appears that reducing the concentration of active cobalt (III) below the level required in the present invention results in a much lower conversion of durene into pyromellitic acid. Moreover, it is noteworthy that the carboxylic acids formed under these conditions account for only 75 percent of the durene feed, i.e., overoxidation amounts to 25 percent. Thus, it is clear that using high concentrations of active cobalt (III) in accordance with the present invention, not only results in more efficient oxidation of methylaromatics but, still more unexpectedly, results in less overoxidation thereof.

EXAMPLE 5

The procedure of Example 4 was repeated except that 0.27 mole of cobalt acetate were used instead of 0.21 and the reaction mixture was heated at 70°C instead of 60°C. The concentration of active cobalt (III) at the end of the run was 0.76. The molar yield in polycarboxylic acids based on the durene feed were determined to be as follows:

| | | |
|---|---|---|
| Pyromellitic acid | : | 61% |
| Methyltrimellitic acid | : | 20% |

Various modifications of the invention as hereinabove set forth will be obvious to those skilled in the art and it is to be understood that such modifications are to be included within the scope of the present invention. For example, it will be apparent that the starting methylaromatic hydrocarbons referred to in the above examples may be substituted by partially oxidized derivatives thereof, e.g., o-toluic acid may be used instead of o-xylene for the manufacture of phthalic acid.

What is claimed is:

1. A process for the liquid phase oxidation of methylaromatic compounds having at least one methyl substituent on a nuclear carbon atom vicinal to another nuclear carbon atom substituted by a radical selected from the group consisting of methyl, hydroxymethyl, formyl and carboxyl radicals, to form aromatic polycarboxylic acids having at least two carboxyl groups on vicinal nuclear carbon atoms, which process comprises reacting in acetic acid said methylaromatic compounds with a cobalt salt while maintaining such a concentration of cobaltic ions that $2x-A$ is at least 0.4, $x$ and $A$ being respectively the molarity of said cobaltic ions and said cobalt salt in the reaction mixture, at a temperature of between 20 and 100°C and in the presence of molecular oxygen at a partial pressure of from 0.2 to 20 atmospheres.

2. The process of claim 1 wherein the reaction is carried out in the presence of an aldehyde.

3. The process of claim 2 wherein the aldehyde is acetaldehyde.

4. The process of claim 1 wherein the reaction temperature is between 40° and 80°C.

5. The process of claim 1 wherein the cobalt salt is the cobalt salt of a saturated aliphatic acid.

6. The process of claim 5 wherein the cobalt salt is cobalt acetate.

* * * * *

UNITED STATES PATENT OFFICE
CERTIFICATE OF CORRECTION

Patent No. 3,852,342      Dated December 3, 1974

Inventor(s) Jacques D. V. Hanotier

It is certified that error appears in the above-identified patent and that said Letters Patent are hereby corrected as shown below:

On the cover sheet insert -- [30] Foreign Application Priority Data

France     7133503     Sept. 17, 1971 --.

Signed and sealed this 22nd day of April 1975.

(SEAL)
Attest:

RUTH C. MASON
Attesting Officer

C. MARSHALL DANN
Commissioner of Patents
and Trademarks